United States Patent [19]

Kosuda et al.

[11] Patent Number: 4,969,354

[45] Date of Patent: Nov. 13, 1990

[54] INTAKE PIPE PRESSURE DETECTING DEVICE

[75] Inventors: Toru Kosuda; Yasuyuki Kawabe, both of Okazaki; Iwao Yokomori, Kariya; Osamu Ina, Anjo, all of Japan

[73] Assignees: Nippondenso Co., Ltd., Kariya; Nippon Soken, Inc., Nishio, both of Japan

[21] Appl. No.: 376,282

[22] Filed: Jul. 6, 1989

[30] Foreign Application Priority Data

Jul. 8, 1988 [JP] Japan .................. 63-171313

[51] Int. Cl.⁵ ............................. G01M 15/00
[52] U.S. Cl. ............................. 73/118.200
[58] Field of Search .............. 73/115, 116, 118.2, 73/706, 714

[56] References Cited

FOREIGN PATENT DOCUMENTS

| | | | |
|---|---|---|---|
| 2292965 | 6/1976 | France | 73/706 |
| 57-138036 | 8/1982 | Japan . | |
| 58-174145 | 10/1983 | Japan . | |
| 59-190634 | 10/1984 | Japan . | |
| 60-100570 | 7/1985 | Japan . | |
| 63-229341 | 9/1988 | Japan . | |

*Primary Examiner*—Robert Raevis
*Attorney, Agent, or Firm*—Cushman, Darby & Cushman

[57] ABSTRACT

Disclosed in an intake pipe pressure detecting device for detecting the pressure in that section of an intake pipe in an internal combustion engine which is on the downstream side of a throttle valve provided in the intake manifold. The pressure detecting device comprises a mixing chamber which has an opening in the wall of the intake pipe, a pressure introducing path which opens onto this mixing chamber, and air inlets adapted to allow fresh air to enter the mixing chamber, thereby generating an air flow directed from the mixing chamber to the intake pipe.

23 Claims, 12 Drawing Sheets

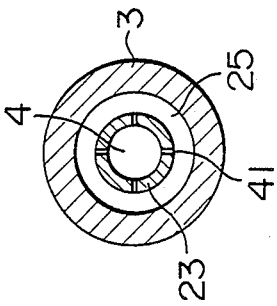
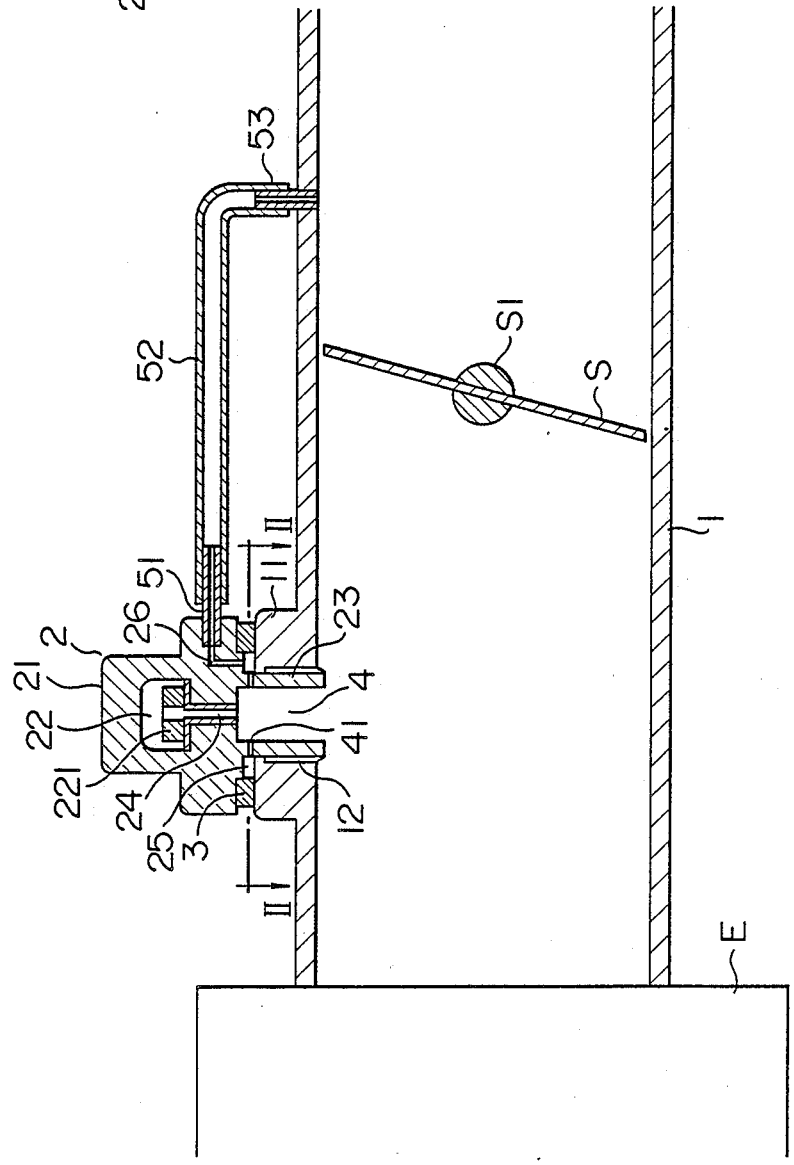

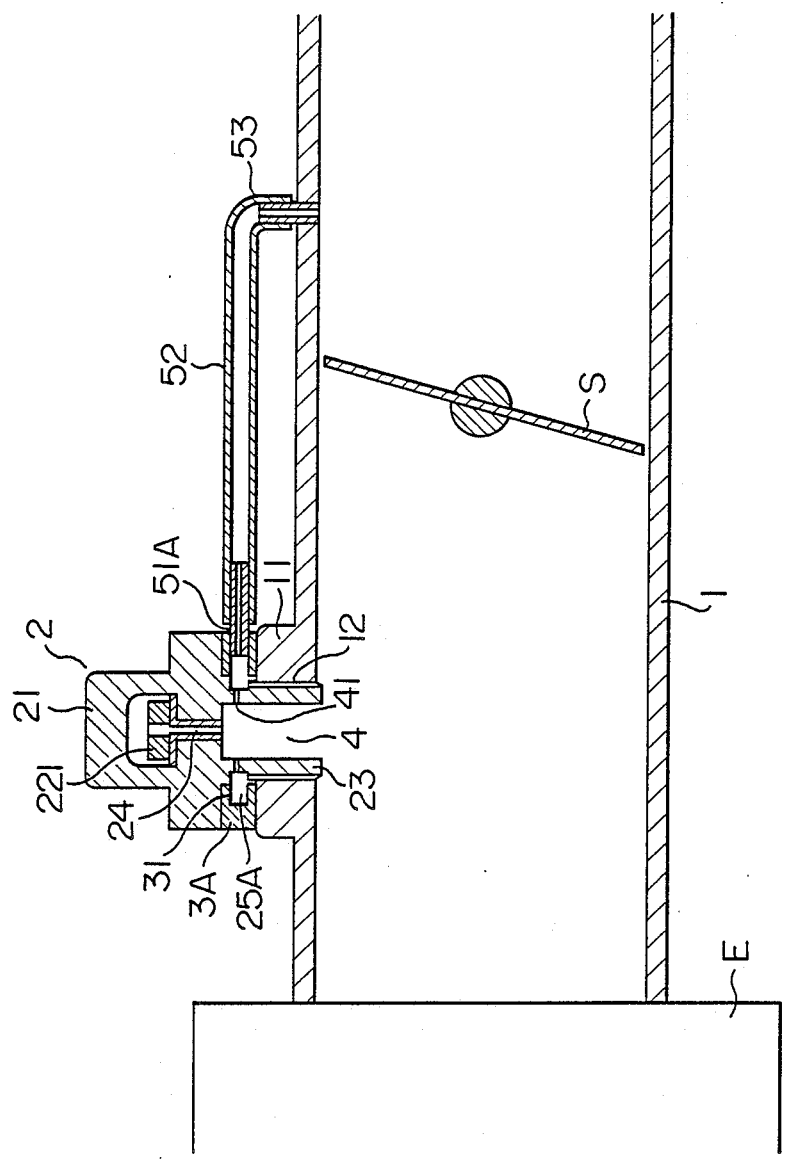

L=21.5mm

L=28.5mm

A
INTAKE PIPE PRESSURE DETECTING DEVICE

BACKGROUND OF THE INVENTION

This invention relates to an intake pipe pressure detecting device for detecting the pressure in the intake pipe of an internal combustion engine.

Conventionally, the pressure in the intake pipe of an internal combustion engine, i.e., in that section of the intake pipe which is on the downstream side of the throttle valve, has been detected by means of a pressure sensor for the purpose of detecting the intake air amount for the internal combustion engine, thereby controlling the fuel supply amount to the engine, etc. The pressure sensor is usually connected through a pressure introducing pipe to the wall of the intake pipe section situated on the downstream side of the throttle valve, the pressure in the intake pipe being introduced into the pressure sensor through the pressure introducing pipe.

The air flow in the intake pipe, in particular in that section of the intake pipe which is on the downstream side of the throttle valve, contains various contaminants, such as blow-by gas and recirculated exhaust gas (EGR gas). If allowed to enter the pressure sensor, these contaminants will adhere to the sensor wall, thereby deteriorating the accuracy and durability of the pressure sensor. In view of this, Japanese Utility Model Laid-Open No. 57-138036 proposes a pressure detecting device in which any contaminants are prevented from entering the pressure sensor by means of a fresh-air introducing path which serves to introduce clean air into the pressure introducing pipe.

In the above-mentioned pressure detecting device proposed, however, clean air is introduced into a pressure introducing pipe which has a small diameter, so that, in order to avoid a pressure rise in the pressure introducing pipe, only a moderate amount of fresh air can be introduced thereto. As a result, the complete prevention of contaminant intrusion cannot be realized with this device.

SUMMARY OF THE INVENTION

This invention has been contrived with a view to overcoming the above-mentioned problem experienced with prior art pressure detecting devices. It is accordingly an object of this invention to provide an intake pipe pressure detecting device which is capable of reliably preventing any contaminants from entering the pressure introducing pipe by supplying thereto a sufficient amount of fresh air, and which involves no pressure rise in the pressure introducing pipe, thereby allowing the pressure in the intake pipe to be detected with high accuracy.

In accordance with this invention, the above problem is solved by a pressure detecting device for detecting the pressure in that section of the intake pipe of an internal combustion engine which is situated on the downstream side of the throttle valve, comprising a pressure sensor, a pressure introducing path for introducing the pressure in the intake pipe into the pressure sensor, a mixing chamber formed in the joint section between the pressure introducing path and the intake pipe and having an opening area which is larger than that of the above-mentioned pressure introducing path, the front end of the pressure introducing path communicating with the mixing chamber, which is open on the inner space of the intake pipe and which has in its wall air inlets adapted to generate an airflow directed from the mixing chamber to the intake manifold.

As stated above, the air inlets provided in the wall of the mixing chamber in the above-described construction generate an air flow directed from the mixing chamber to the intake pipe. Since the mixing chamber has an opening area which is sufficiently larger than that of the pressure introducing path and which is directly open on the inner space of the intake pipe, practically no pressure rise occurs in the mixing chamber even if a large amount of air is introduced thereto through the air inlets. Accordingly, a sufficient amount of air can be introduced into the mixing chamber, thereby making it possible to reliably prevent the intrusion of contaminants.

BRIEF DESCRIPTION OF THE DRAWINGS

FIG. 1 is a sectional view showing a first embodiment of this invention;

FIG. 2 is a sectional view taken along the line II–II of FIG. 1;

FIG. 3 is a sectional view showing a second embodiment of this invention;

DESCRIPTION OF THE PREFERRED EMBODIMENTS

Figure 4:
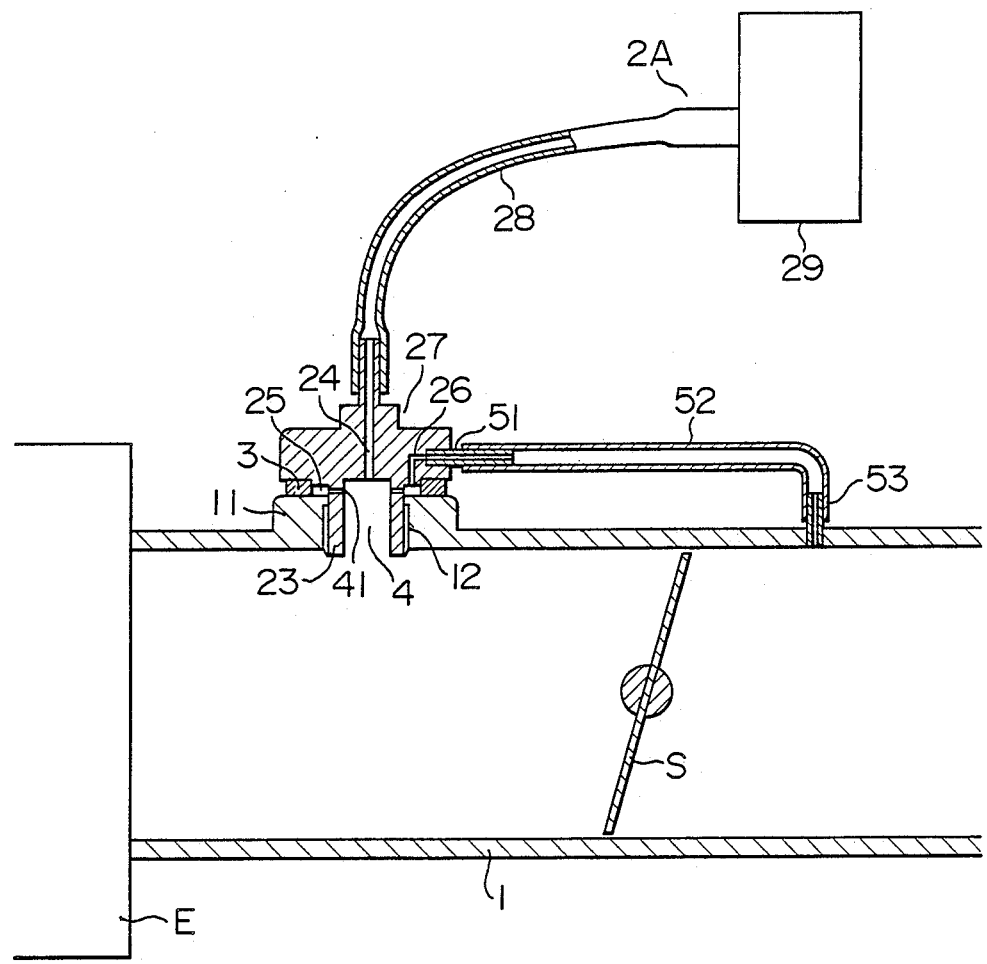
FIG. 4 is a sectional view showing a third embodiment of this invention.

Preferred embodiments of this invention will now be described with reference to the accompanying drawings, in which identical or equivalent components are referred to by the same reference numerals.

FIGS. 1 and 2 show a first embodiment of this invention. The reference numeral 1 indicates an intake pipe connected to an internal combustion engine E. Arranged in the intake pipe 1 is a throttle valve S supported by a shaft S1. The valve opening of this throttle valve S is adjusted through the rotation of the shaft S1 linked with the accelerator through a mechanism (not shown), thereby controlling the amount of air supplied to the internal combustion engine E. Connected to that section of the wall of the intake pipe 1 which is on the downstream side of the throttle valve S is a pressure sensor 2 of a semiconductor type. The pressure sensor 2 includes a housing 21 formed as a cylindrical body which is closed at one end and which defines inside a pressure chamber 22, part of the end section on the opening side of the housing 21 being formed as an outwardly protruding cylindrical screw section 23 having thread grooves in the outer periphery thereof. Arranged in the pressure chamber 22 is a pressure detecting member 221 having a well-known silicon diaphragm. On the other hand, the wall of the intake pipe 1 includes a protruding section 11 which has at its center a screw hole 12. The above-mentioned screw section 23 of the pressure sensor 2 is screwed into this screw hole 12, thereby fixing the pressure sensor 2 to the intake pipe 1 with the intermediary of an annular gasket 3.

The space within the screw section 23 constitutes a mixing chamber 4 which is open on the inner space of the intake pipe 1 and which communicates with the pressure detecting member 221 in the pressure chamber 22 through a pressure introducing path 24 having a relatively small diameter. Thus, the pressure in the intake pipe 1 is introduced to the pressure detecting member 221 through the mixing chamber 4 and the pressure introducing path 24.

The inner diameter of the above-mentioned gasket 3 is larger than the outer diameter of the screw section 23, defining a sealed annular chamber 25 around the screw section 23. Provided in that section of the screw section 23 which separates the mixing chamber 4 from the above-mentioned annular chamber 25 are a plurality of air inlets 41 through which the chambers 4 and 25 communicate with each other.

Provided in the side wall of the above-mentioned housing 21 is an air introducing path 26 leading to the annular chamber 25. An air introducing pipe 51 is forced into the opening of this air introducing path 26. This air introducing pipe 51 is connected to one end of a duct 52. The other end of this duct 52 is connected to an air outlet pipe 53 which is provided in the wall of the inlet pipe in such a manner as to extend through the same. As a result of this arrangement, some of the clean air on the upstream side of the throttle valve is introduced into the mixing chamber 4 through the duct 52, the air introducing path 26, the annular chamber 25 and the air inlets 41. If the amount of air supplied to the mixing chamber through the air inlets 41 is insufficient, the intrusion of contaminants cannot be checked completely. Conversely, if too much air is supplied, an excessive degree of noise will be involved while injecting the air through the air inlets 41 into the mixing chamber 4. In view of this, the size and number of the air inlets 41 are determined such that the amount of air introduced into the mixing chamber is in the range 3 to 30 l/min, preferably 10 l/min.

In addition, if the area of the opening through which the mixing chamber 4 communicates with the intake pipe 1 is relatively small, the air supplied to the mixing chamber 4 through the air inlets 41 makes it impossible to perform correct pressure detection. When, as in this embodiment, the mixing chamber 4 has a cylindrical configuration, the diameter thereof should be 4 mm or more, preferably 6 to 15 mm or so. This corresponds to about 4 to 5 times the opening area of the pressure introducing path 24.

In order to prevent as much contaminant intrusion as possible, the distance between the opening end of the mixing chamber 4 and the pressure introducing path 24 is double the diameter of the mixing chamber 4 or more.

The operation of the pressure detecting device of this invention will now be described.

In the above-described construction, air is introduced into the internal combustion engine E through the intake pipe 1, and the output of the engine E is controlled by narrowing the air passage in the intake pipe 1 by means of the throttle valve S, with the result that the pressure on the downstream side of the throttle valve S is lower than that on the upstream side thereof.

The mixing chamber 4 of the pressure sensor 2 is under the action of the pressure on the downstream side of the throttle valve S. As a result, the pressure difference between the upstream and downstream sides of the throttle valve S causes some of the air on the upstream side of the throttle valve S to be constantly introduced into the mixing chamber 4 through the duct 52, the air introducing path 26, the annular chamber 25 and the air inlets 41.

Generally speaking, the pressure on the downstream side of the throttle valve S of the intake manifold 1 fluctuates to a large degree due to the intake pulsation of the internal combustion engine E. The opening and closing of the throttle valve S also causes a large pressure fluctuation. On the other hand, contaminants such as blow-by gas and recirculated exhaust gas (EGR gas) are usually introduced to the downstream side of the throttle valve S, being evenly dispersed there. As a result, gas exchange takes place also in the mixing chamber 4 in response to the pressure fluctuation. As stated above, however, the mixing chamber 4 is constantly supplied with clean air from the intake pipe section on the upstream side of the throttle valve S through the air inlets 41, generating an air flow directed from the mixing chamber 4 to the intake pipe 1. At the same time, a layer of clean air is formed in the vicinity of the boundary section between the mixing chamber 4 and the pressure introducing path 24 which connects the mixing chamber 4 to the pressure detecting member 221. Thus, because of the presence of this layer of clean air, no contaminants can enter the pressure introducing path 24, only clean air having access to the pressure detecting member 221. Furthermore, since the mixing chamber 4 has a diameter sufficiently larger than that of the pressure introducing path 24 and is directly open on the inner space of the intake pipe 1, almost no pressure rise occurs in the mixing chamber 4 even if a large amount of air is introduced thereto through the air inlets 41. Accordingly, the mixing chamber 4 can be supplied with a sufficient amount of air, thereby making it possible to reliably prevent any contaminants from entering the mixing chamber and to detect the pressure in the intake pipe 1 with accuracy. In addition, the pressure detecting device of this embodiment is compact and easy to mount since, unlike conventional devices, it employs no pressure introducing pipe for connecting the pressure sensor to the intake pipe, the pressure sensor itself having a screw section by means of which it is directly connected to the intake pipe.

FIG. 3 shows a second embodiment of this invention. In this embodiment, an annular groove 31 is provided in the inner periphery of the gasket 3A to define an annular chamber 25A. An air introducing pipe 51A communicating with this annular groove 31 extends through the gasket 3A, and a duct 52 communicating with the upstream side of the throttle valve S is connected to the air introducing pipe 52. Thus, in this embodiment, the air introducing pipe 51A is attached to the gasket 3A, so that, irrespective of the mounting condition of the pressure sensor 2, the air introducing pipe 51A can constantly be set in a free position, thereby facilitating the attachment of the duct 52 to the air outlet pipe 53.

FIG. 4 shows a third embodiment of this invention. In this embodiment, the main body 29 of the pressure sensor 2A, including the pressure detecting member, is formed as a separate component which is connected through a pressure introducing pipe 28 to a joint section 27 mounted on the intake pipe 1. The lower half of the joint section 27 is formed as a hollow screw section 23, which is screwed into a screw hole 12 provided in the wall of the intake pipe 1. The inner space of the screw section 23 constitutes a mixing chamber 4 which communicates with the above-mentioned pressure introducing pipe 28 through a pressure introducing path 24. Since, in this embodiment, the pressure in the intake pipe 1 is introduced into the main body 29 through the pressure introducing pipe 28, there is less danger of any contaminants entering the main body 29, thereby preventing contamination more reliably.

It goes without saying that the air introducing pipe 51 for introducing some of the air on the upstream side of the throttle valve S into the mixing chamber may be directly connected to the gasket 3, in the same manner in which the pipe 51A in the above-described second embodiment is connected to the gasket 3A.

Figure 5:
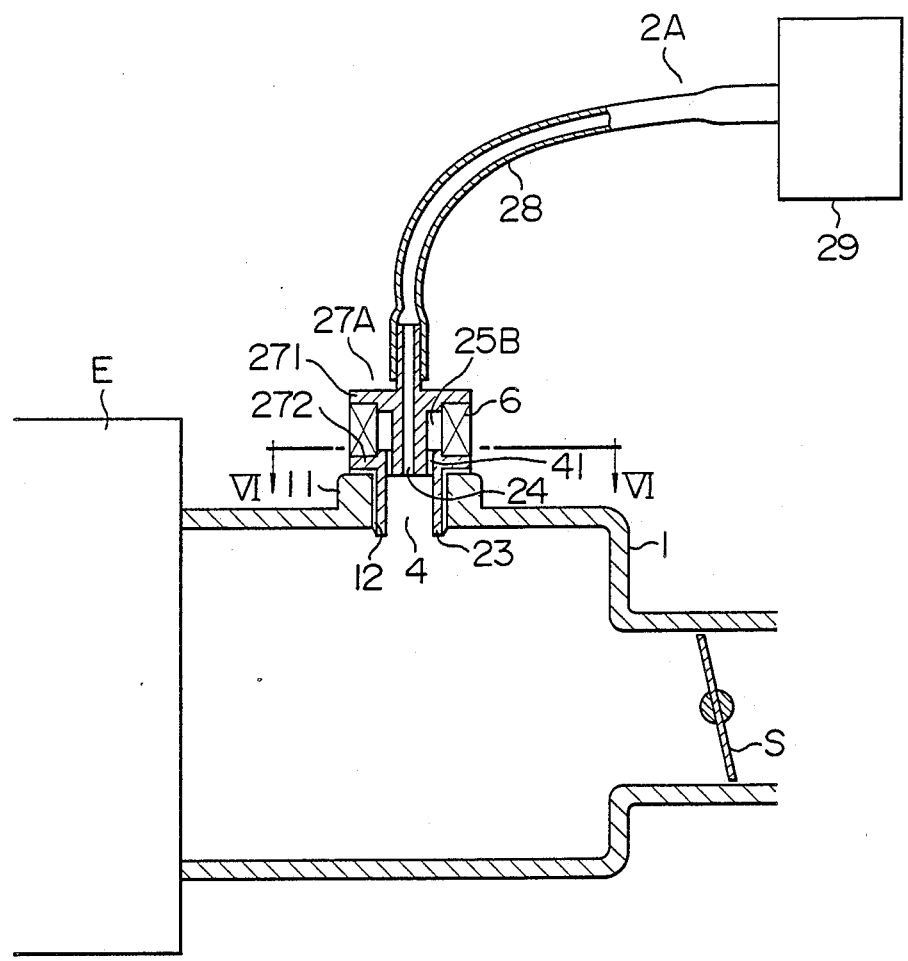
FIG. 5 is a sectional view showing a fourth embodiment of this invention.
Figure 6:
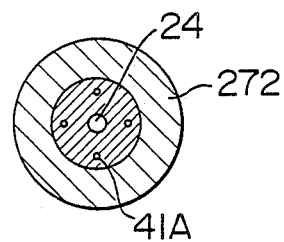
FIG. 6 is a sectional view taken along the line VI–VI of FIG. 5.

FIGS. 5 and 6 show a fourth embodiment of this invention. In this embodiment, the mixing chamber 4 is supplied not with some of the air in the upstream section of the intake pipe 1 but with atmospheric air. As shown in the drawing, the main body 29 of the pressure sensor 2A is connected to the intake pipe 1 through a pressure introducing pipe and a joint section 27A. Provided on the upper section of the joint section 27A is an annular air bleed filter 6, positioned between flange sections 271 and 272, an annular chamber 25B being defined between the inner peripheral wall of the air bleed filter 6 and the outer peripheral wall of that part of the joint section 27A which includes the pressure introducing path 24. Formed in the chamber wall section which separates the above-mentioned annular chamber 25B from the mixing chamber 4 situated below are a plurality of air inlets 41 connecting these two chambers to each other.

In the above-described construction, the air intake passage in the intake pipe 1 is narrowed by the throttle valve S, so that the pressure in the intake pipe is higher on the downstream side than on the upstream side of the throttle valve S. As a result, clean atmospheric air, from which any dust, etc. has been removed while passing through the air bleed filter 6, is introduced into the mixing chamber 4 through the annular chamber 25B and the air inlets 41A. With this construction, as with the above-described embodiments, contaminants are prevented from entering the pressure introducing path 24.

While in this embodiment the flange sections 271 and 272 are formed integrally, it is also possible to form the upper and lower flange sections 271 and 272 as separate members. The air bleed filter 6 is then first mounted on the lower flange section 272, and is fixed in position by attaching thereto the upper flange section 271 afterwards.

Figure 7:
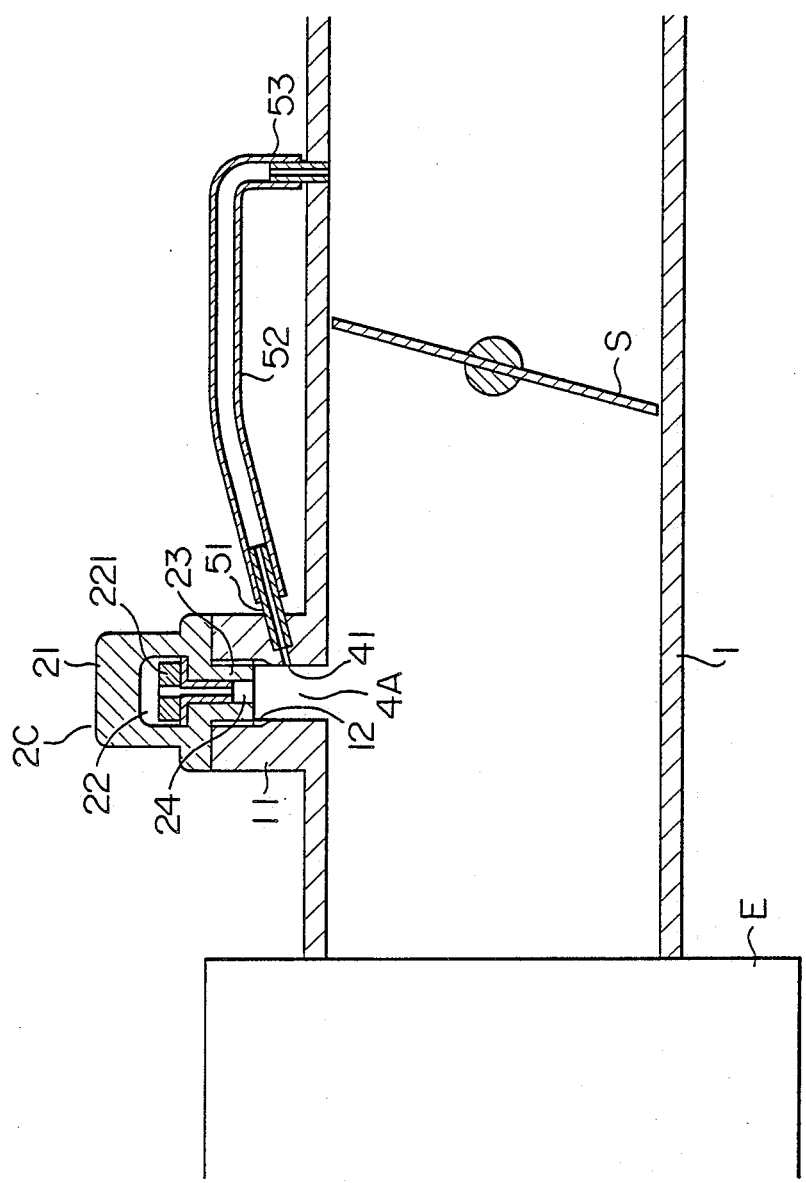
FIG. 7 is a sectional view showing a fifth embodiment of this invention.

FIG. 7 shows a fifth embodiment of this invention. In this embodiment, the intake pipe 1 has a relatively high protruding section 11, the inner periphery of the upper half of which is formed as a screw hole 12 for connecting the pressure sensor 2c to the intake pipe 1. The lower half of the protruding section 11 constitutes a mixing chamber 4A. The side wall of the mixing chamber 4A includes an air inlet 41 which communicates with an air introducing pipe 51, through which some of the air on the upstream side of the throttle valve S is introduced into the mixing chamber 4A.

Figure 8:
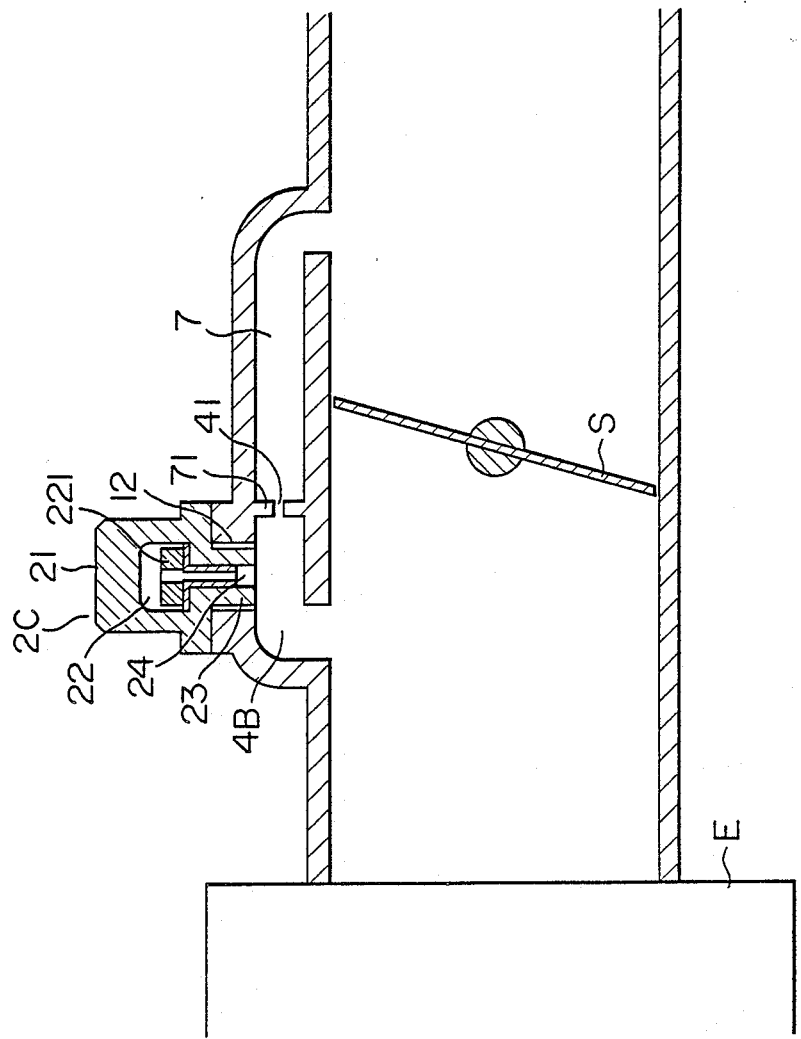
FIG. 8 is a sectional view showing a sixth embodiment of this invention.

FIG. 8 shows a sixth embodiment of this invention. In this embodiment, the wall of the intake pipe 1 includes a by-path 7 connecting the upstream and downstream sides of the throttle valve S to each other. The by-path 7 includes a partition 71 dividing the by-path 7 into upstream and downstream sections. The downstream section of the by-path 7 serves as a mixing chamber 4B, and the partition 71 includes an air inlet 41 through which the mixing chamber 4B is supplied with air from the upstream side of the throttle valve S. The top wall of the mixing chamber 4B includes a screw hole 12 by means of which the pressure sensor 2d is fixed to the intake pipe 1.

The constructions in accordance with these fifth and sixth embodiments of this invention provide the same effect as the foregoing embodiments. It goes without saying that the fifth and sixth embodiments may adopt a pressure sensor 2c of the type composed of a main body and a joint section which are connected to each other through a duct, instead of the type which is directly fixed to the wall of the intake pipe 1.

While in the above-described embodiments the amount of air introduced into the mixing chamber is controlled by adjusting the size and number of the air inlets 41, the amount of air may also be controlled by means of a throttle member provided in the air introducing pipe 51.

Next, an explanation will be given of the most suitable dimensions for the mixing chamber 4 as well as the most suitable amount of air Q introduced into the mixing chamber 4 on the basis of the results of an experiment conducted by the inventors of this invention.

Figure 9:
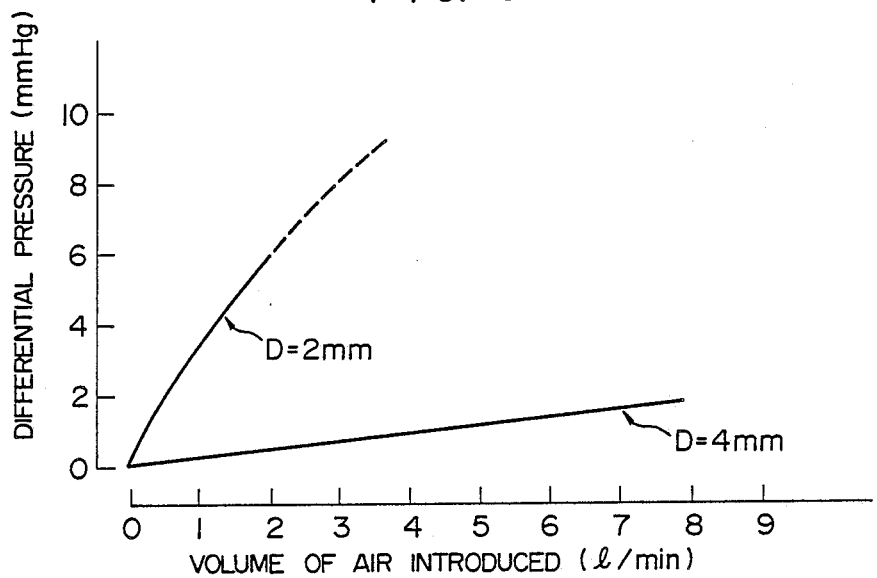
FIG. 9 is a chart showing the relationship between the air introduction amount and the differential pressure in this invention.
Figure 10:
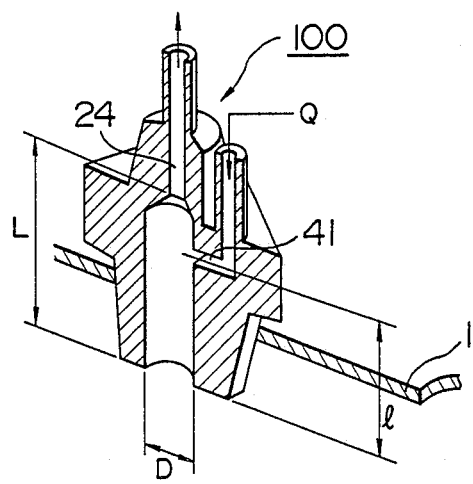
FIG. 10 is a perspective sectional view of an experimental filter.

FIG. 9 shows measurement results indicating the relationship between the amount of air Q introduced into the mixing chamber 4 and the differential pressure. An experimental filter 100 having the configuration as shown in FIG. 10 was employed for the measurement. This filter 100 constitutes a mixing chamber 4. In FIG. 10, the reference character D indicates the diameter of the mixing chamber 4, l the distance between the opening of the mixing chamber 4 and the air inlet 41, L the distance between the opening of the mixing chamber 4 and the pressure introducing path 24, and Q the amount of air introduced into the mixing chamber 4. The diameter of the pressure introducing path 24 is 2 mm.

Figure 11:
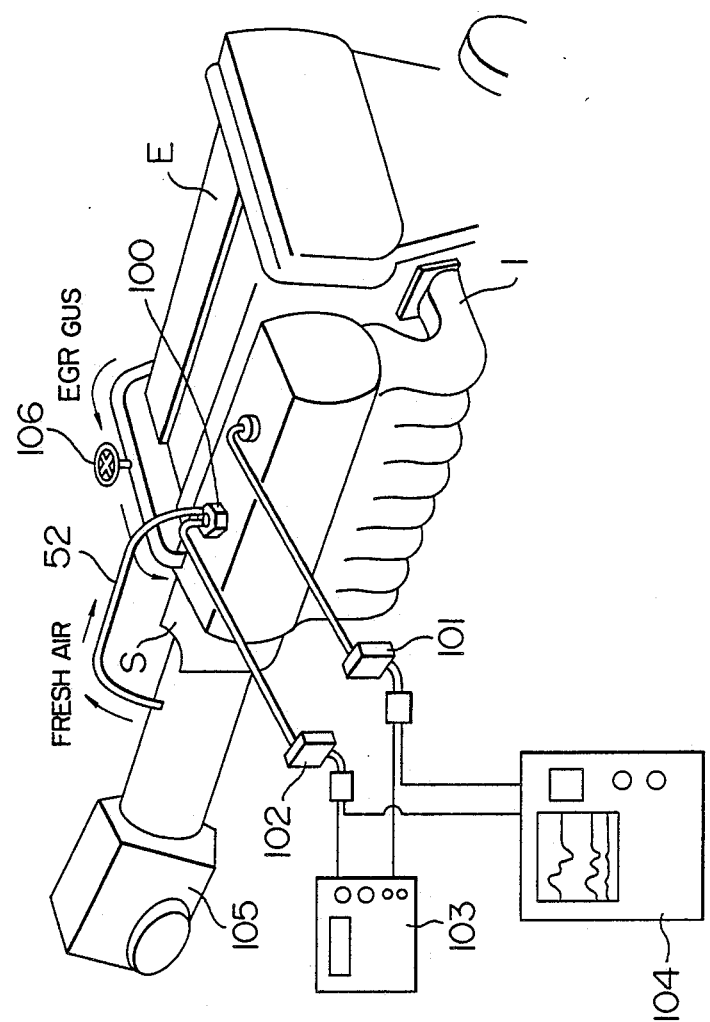
FIG. 11 is a perspective view showing the construction of a pressure measuring apparatus.

The "differential pressure" means the absolute value of a pressure value obtained by subtracting the pressure detected by a pressure sensor 102 through the filter from the pressure in the intake pipe 1 detected by a pressure sensor 101. The pressure measuring apparatus shown in FIG. 11 further includes a power source 103, an oscilloscope 104, an air cleaner 105, and an EGR gas adjusting valve 106. As will be appreciated from FIG. 9, the differential pressure is lower when D=4 mm than when D=2 mm. Thus, in order to improve the pressure detection accuracy by suppressing the differential pressure, it is desirable that the diameter D be larger.

Figure 12:
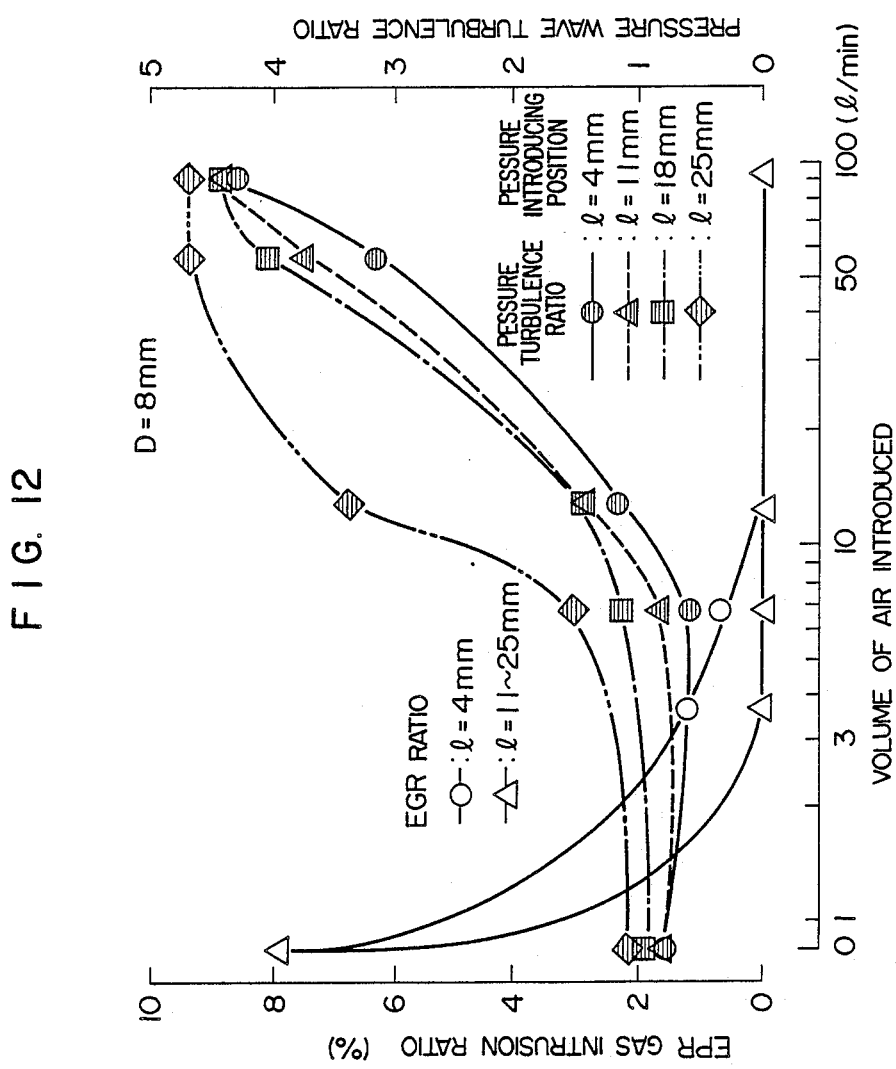
FIG. 12 is a chart showing the relationship between the air introduction amount, recirculated gas (EGR gas) intrusion ratio, and pressure wave turbulence ratio.
Figure 13:
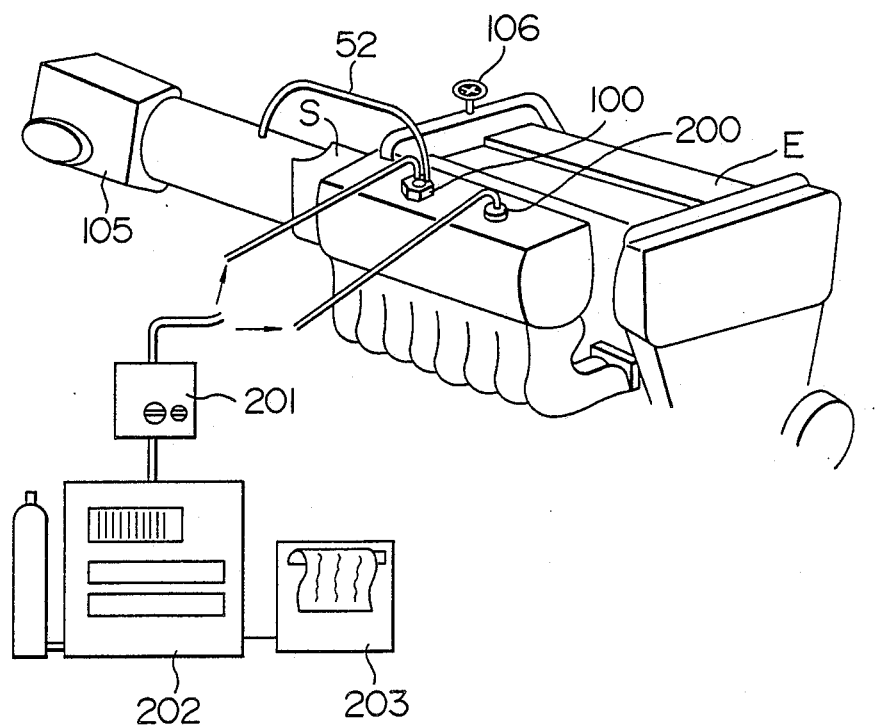
FIG. 13 is a perspective view showing the construction of an apparatus for measuring the EGR gas intrusion ratio.

Next, FIG. 12 shows measurement results indicating the relationship between the amount of air Q introduced into the mixing chamber, the EGR gas intrusion ratio, and the pressure wave turbulence ratio. Filters of the same type as the filter 100 shown in FIG. 10 were also employed in this measurement. The filter dimension D adopted was 8 mm and L 28.5 mm for all the filters used, the dimension l being different for different filters, as 4, 11, 18 and 25 mm. Here, the "EGR gas intrusion ratio" denotes the ratio of the amount of EGR gas intruding into the vacuum pump 201 side through the filter 100, which allows air to enter the mixing chamber, to the amount of EGR gas intruding into the vacuum pump 201 side through a filter 200 which does not allow any air to enter the mixing chamber 4. The measuring apparatus shown further includes a gas analyzing device 202 and a printer 203. The "pressure wave turbulence ratio" denotes the differential voltage width between the pressure waveform detected by the pressure sensor 101 and displayed on the oscilloscope 104 and the pressure waveform detected by the pressure sensor 102 and displayed on the oscilloscope 104. The measurement conditions on the side of the internal combustion engine E were: a steady state at 40 km/h (1600 rpm, 1.4 kgm), an EGR ratio of 8%, and a total air flow rate of 276 l/min.

As will be appreciated from FIG. 12, determining the amount of air Q introduced into the mixing chamber 4 in the range $3 \leq Q \leq 10$ l/min makes it possible to keep both the EGR gas intrusion ratio and the pressure wave turbulence ratio relatively low, thus resulting in an intake manifold pressure detecting device which can suppress the intrusion of any contaminants and which is capable of conducting pressure detection with high accuracy.

By the "amount of air Q introduced into the mixing chamber" is meant here a volume of air introduced under condition that the differential pressure between the sections on both sides of the air inlets 41 be 300 mmHg or more, i.e., the condition in which the flow velocity has reached acoustic velocity. This amount Q is controlled by adjusting the size and number of the air inlets 41, i.e., adjusting the total opening area of the air inlets 41.

Figure 14A:
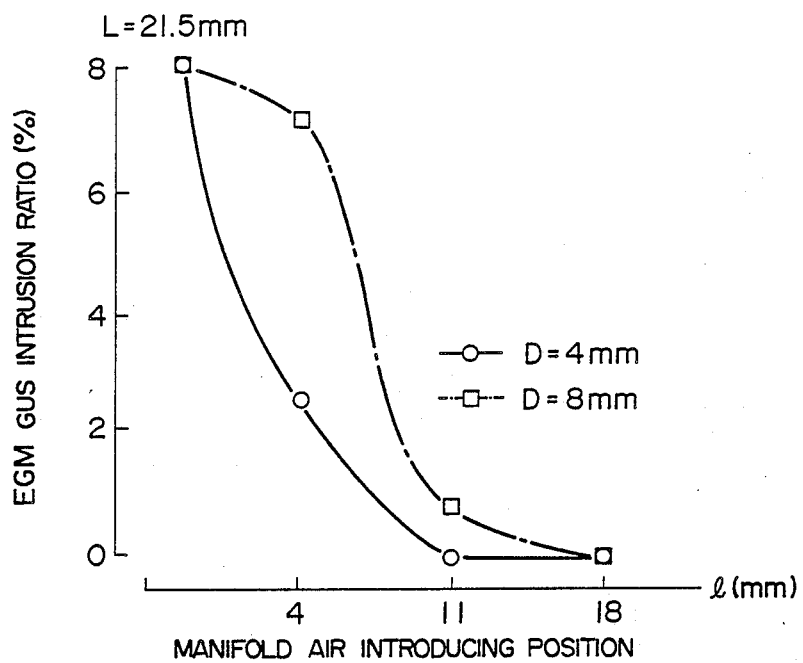
FIGS. 14A and 14B are charts showing the relationship between the air introducing position and the EPR gas intrusion ratio in mixing chambers having different dimensions.
Figure 14B:
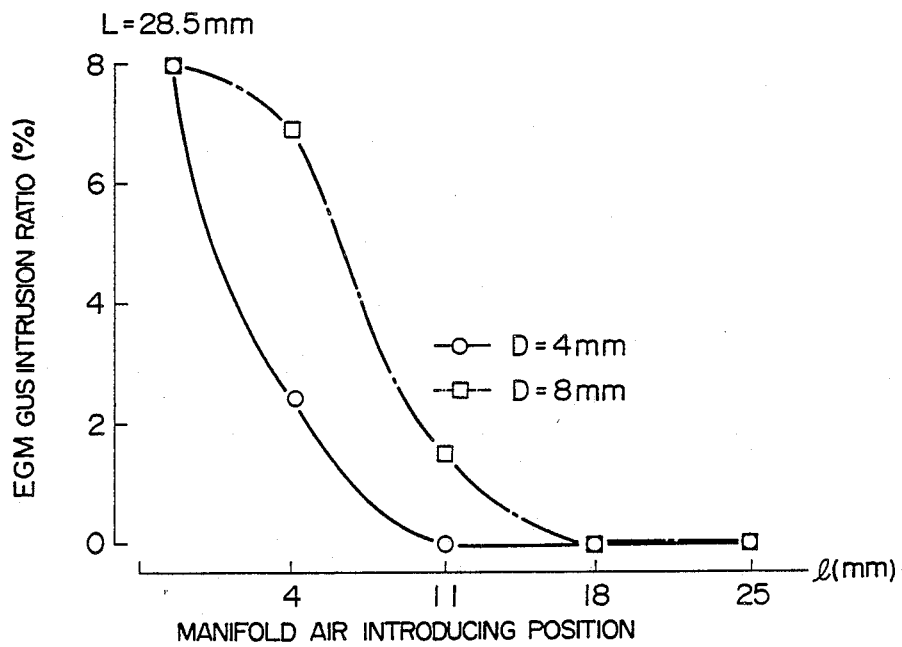

Next, the EGR intrusion ratio will be explained in more detail with reference to FIGS. 14A and 14B. FIG. 14A shows the measurement results when L=21.5 mm, and FIG. 14B when L=28.5 mm. The circular and square plot symbols in the drawings represent the measurement results when D=4 mm and when D=8 mm, respectively. The amount of air Q introduced into the mixing chamber was kept at a constant value of 8 l/min, the measurement conditions on the internal combustion engine E side were the same as in the measurement of FIG. 12. As will be appreciated from FIGS. 14A and 14B, the EGR gas intrusion ratio can be kept considerably low when l<11 mm. Further, when d=4 mm, the EGR gas intrusion ratio can be reduced to almost 0%.

Figure 15A:
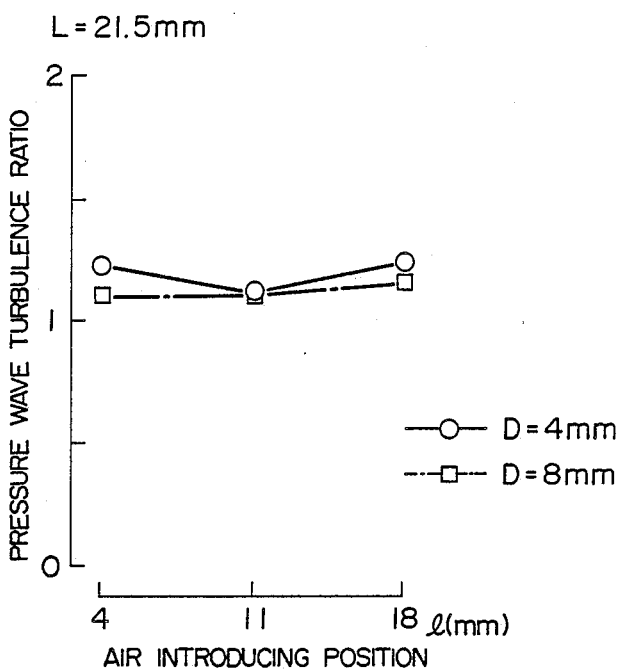
FIGS. 15A and 15B are charts showing the relationship between the air introducing position and the pressure wave turbulence ratio in mixing chambers having different dimensions.
Figure 15B:
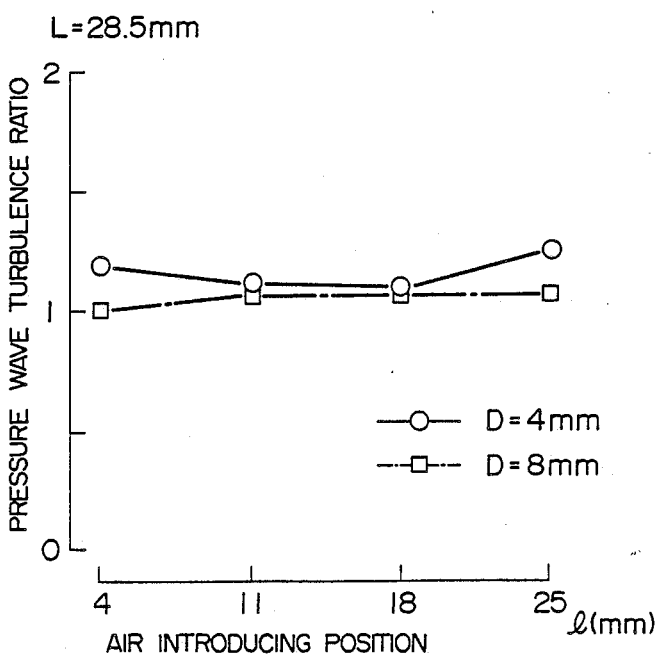

Thus, as will be appreciated from the measurement results shown in FIGS. 9, 12, 14A and 14B, the most suitable dimensions for the mixing chamber 4 and the most suitable volume of air Q can be determined as : D>4 mm, l<11 mm, and 3<Q<10 l/min. An intake pipe pressure detecting device which can suppress the intrusion of any contaminants and which is capable of conducting pressure detection with high accuracy can be realized by a design in accordance with these values. The value of D, which is 8 mm in the example shown in FIG. 12, tends to cause the pressure wave turbulence ratio to increase when it is determined to be relatively small, e.g., 4 mm. However, as shown in FIGS. 15A and 15B, the difference in the pressure wave turbulence ratio between the cases where D=8 mm and where d=4 mm is so small that it is negligible to some extent as long as D is not smaller than 4 mm. FIGS. 15A and 15B show the measurement results when L=21.5 mm and when L=28.5 mm, respectively, and the circular and square plot symbols represent the measurement results when D=4 mm and when D=8 mm, respectively.

Next, some preferable forms will be considered in terms of the opening direction of the air inlets 41 with respect to the mixing chamber 4, and in terms of the number of air inlets 41.

Figure 16A:
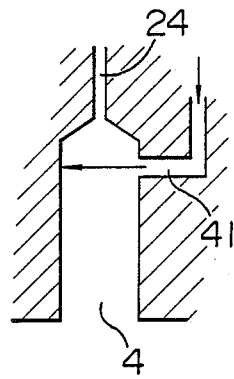
FIGS. 16A and 16B illustrate the effects attained with air inlets having different air-inlet angles.
Figure 16B:
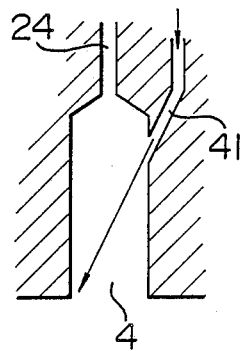

First, the opening direction of the air inlets 41 will be considered with reference to FIGS. 16A and 16B. It is desirable that this opening direction be somewhere between the direction perpendicular to the inner wall of the mixing chamber 4 (FIG. 16A) and the direction in which the opening of the air inlet 41 and the other end of the opening of the mixing chamber 4 lie (FIG. 16B). If this opening direction is on the side of the pressure introducing path 24 with respect to the above-mentioned perpendicular direction, the air introduced into the mixing chamber is likely to enter the pressure introducing path 24, thereby causing pressure fluctuation to occur. If, on the other hand, the opening is directed lower than the other end of the opening of the mixing chamber 4, the air introduced into the mixing chamber will flow into the intake pipe 1 without impinging upon the inner wall of the mixing chamber 4, resulting in the contaminant intrusion preventing effect being deteriorated.

As to the number of air inlets 41, it is desirable that a plurality of such inlets be provided. They are preferably uniformly arranged around the mixing chamber 4. If only one air inlet 41 is provided, the air introduced into the mixing chamber 4 will flow from one side of the mixing chamber to the other, so that if the amount of air introduced into the chamber is relatively small, purging will occur only on one side of the mixing chamber, allowing EGR gas to enter the pressure sensor side by way of the other side of the chamber. If, in contrast, a plurality of air inlets 41 are provided and the introduced air is allowed to flow uniformly, the air introduced into the mixing chamber will form a layer over the entire inner surface of the chamber, thereby preventing the intrusion of EGR gas even if the amount of introduced air is relatively small.

In the case of a supercharger engine, when the pressure in the intake manifold exceeds the outside-air pressure, the air bleed flows backwards, which can lead to an increase in contamination, etc. In view of this, a check valve is provided in order to prevent the air in the intake pipe from flowing backwards through the air inlets 41. If supercharging is effected to such a degree that the pressure in the intake pipe exceeds the outside-air pressure, there is no danger of contamination since no EGR occurs then. The check valve will also prove effective when a backfire is generated.

Thus, in accordance with this invention, a mixing chamber having an opening area which is larger than that of the pressure introducing section is provided in the joint section between the pressure sensor and the intake pipe, clean air being introduced into this mixing chamber. As a result of this arrangement, practically no pressure rise occurs in the mixing chamber even if a large volume of air is introduced thereto, thereby enabling the pressure in the intake pipe to be measured with high accuracy. Furthermore, since this arrangement allows a large amount of air to be introduced into the mixing chamber, any contaminants can be reliably prevented from entering the pressure sensor, thereby substantially improving the durability of the pressure sensor.

Further, by setting the relevant dimensions and the volume of air introduced as: D>4 mm, l>11 mm, 3<Q<10 l/min, contaminant intrusion can be prevented and pressure fluctuation subdued, thereby improving the pressure measurement accuracy.

The above effects can be further enhanced by setting the opening direction of the air inlet at a certain predetermined angle or providing a plurality of such air inlets.

What is claimed is:

1. An intake pipe pressure detecting device for detecting a pressure in a section of an intake pipe in an internal combustion engine which is on a downstream side of a throttle valve provided in the intake pipe, comprising:
   a pressure sensor,
   a pressure introducing path for introducing the pressure in the intake pipe into said pressure sensor, and
   a mixing chamber which opens directly to said intake pipe, and is formed in a joint section between said pressure introducing path and the intake pipe and which has a diameter D and an opening area that is larger than an opening area of said pressure introducing path, said pressure introducing path communicating with said mixing chamber, said mixing chamber opening into said intake pipe and including at least one air inlet situated at a distance l from the intake pipe and adapted to allow air in an amount Q to directly enter said mixing chamber, thereby generating an air flow which is directed from the mixing chamber to the intake pipe, said at least one air inlet and said opening area of said mixing chamber sized such that (a) an amount of air entering through said at least one air inlet is sufficient to prevent contaminants from entering said mixing chamber and said intake pipe, and such that (b) an amount of air introduced by said air inlet is not sufficient to change a pressure sensed by said pressure sensor.

2. A device as in claim 1 wherein said at least one air inlets have a volume which can allow between 3 and 30 liters per minute of air to be introduced, and a diameter of said mixing chamber is between 6 and 15 millimeters.

3. A device as in claim 1 wherein a volume of said mixing chamber is larger than a total volume of said pressure introducing path added with an inner space of said pressure sensor.

4. An intake piper pressure detecting device as claimed in claim 1, wherein the diameter D of said mixing chamber which is open on said intake pipe is determined as: D≧4 mm, wherein the distance l as: l≧11 mm, and wherein the amount of air Q flowing through said air inlets to said mixing chamber is determined as: 3≦Q≦10 l/min.

5. An intake pipe pressure detecting device as claimed in claim 1 or 4, wherein the opening direction of said air inlet with respect to said mixing chamber is determined somewhere between an angle perpendicular to the inner wall of said mixing chamber and the direction in which lie the opening of that air inlet and the edge diagonally on the opposed side of the opening of said mixing chamber.

6. An intake pipe pressure detecting device as claimed in claim 5, wherein said at least one air inlet are provided at a plurality of positions in said mixing chamber.

7. An intake pipe pressure detecting device as claimed in claim 1 or 4, wherein said at least one air inlet are provided at a plurality of positions in said mixing chamber.

8. An intake pipe pressure detecting device for detecting a pressure in a section of an intake pipe in an internal combustion engine which is on the downstream side of a throttle valve provided in the intake pipe, comprising:
   a mixing chamber having an opening directly into a section of said intake pipe which is on the downstream side of said throttle valve;
   a pressure introducing path which opens onto said mixing chamber;
   a pressure sensor including a main body and a pressure detecting member which is connected to said pressure introducing path; and
   at least one air inlet adapted to supply said mixing chamber with fresh air, thereby generating an air flow which is directed from said mixing chamber to said intake pipe, said at least one air inlet and said opening of said mixing chamber sized such that (a) an amount of air entering through said at least one air inlet is sufficient to prevent contaminants from entering said mixing chamber and said intake pipe, and such that (b) an amount of air introduced by said at least one air inlet is not sufficient to change a pressure sensed by said pressure sensor.

9. An intake pipe pressure detecting device as claimed in claim 8, wherein said mixing chamber has a substantially cylindrical configuration the cross section of which is approximately 4 to 5 times the opening area of said pressure introducing path.

10. An intake pipe pressure detecting device for detecting a pressure in a section of an intake pipe in an internal combustion engine which is on the downstream side of a throttle valve provided in the intake pipe, comprising:
   a mixing chamber having an opening in that section of an intake manifold of the internal combustion engine which is on the downstream side of said throttle valve;
   a pressure introducing path which opens onto said mixing chamber;
   a pressure sensor including a main body and a pressure detecting member which is connected to said pressure introducing path; and
   at least one air inlet adapted to supply said mixing chamber with fresh air, thereby generating an air flow which is directed from said mixing chamber to said intake pipe,
   wherein said mixing chamber has a substantially cylindrical configuration the cross section of which is approximately 4 to 5 times the opening area of said pressure introducing path,
   wherein the wall of said intake pipe includes a protruding section in which a screw hole is formed, said pressure sensor having a screw section which is adapted to be engaged with said screw hole, said mixing chamber being formed inside said screw section, wherein said pressure sensor includes a main body housing with which said screw section is formed integrally, and wherein a gasket is provided between said main body housing and said protruding section, said gasket surrounding said screw section and defining an annular chamber communication with said at least one air inlet between itself and said screw section, said at least one air inlet allowing fresh air to enter said mixing chamber through said annular chamber, one end of said protruding section communicating with said annular chamber through a passage extending through said gasket.

11. An intake pipe pressure detecting device as claimed in claim 9, wherein the wall of said intake pipe includes a protruding section in which a screw hole is formed, said pressure sensor having a screw section which is adapted to be engaged with said screw hole, said mixing chamber being formed inside said screw section, wherein said pressure sensor includes a main body housing with which said screw section is formed integrally, and wherein a gasket is provided between said main body housing and said protruding section, said gasket surrounding said screw section and defining an annular chamber communicating with said at least one air inlet between itself and said screw section, said at least one air inlet allowing fresh air to enter said mixing chamber through said annular chamber, one end of said protruding section communicating with said annular chamber through an air introducing path formed in said housing.

12. An intake pipe pressure detecting device as claimed in claim 8, wherein said mixing chamber has a substantially cylindrical configuration the diameter of which is 4 mm or more.

13. An intake pipe pressure detecting device as claimed in claim 12, wherein the wall of said intake pipe includes a protruding section in which a screw hole is formed, said pressure sensor having a screw section which is adapted to be engaged with said screw hole, said mixing chamber being formed inside said protruding section.

14. An intake pipe pressure detecting device as claimed in claim 8, wherein said mixing chamber has a substantially cylindrical configuration the diameter of which is in the range of 6 to 15 mm.

15. An intake pipe pressure detecting device as claimed in claim 8, further comprising a duct one end of which communicates with said air inlet and the other end of which is open into the inner space of that section of the intake pipe which is on the upstream side of the throttle valve.

16. An intake pipe pressure detecting device as claimed in claim 8, wherein said air inlet is open to the atmosphere.

17. An intake pipe pressure detecting device as claimed in claim 8, wherein said air inlet is open to the atmosphere through an air-bleed filter.

18. An intake pipe pressure detecting device as claimed in claim 8, wherein a by-path is formed integrally with the wall of said intake pipe, one end of which communicates with said air inlet and the other end of which is open into the inner space of that section of said intake pipe which is on the upstream side of the throttle valve.

19. An intake pipe pressure detecting device as claimed in claim 8, wherein the main body of said pressure sensor containing said pressure detecting member is connected to said pressure introducing path through a pressure introducing pipe.

20. An intake pipe, pressure detecting device as claimed in claim 19, wherein the wall of said intake pipe includes a protruding section in which a screw hole is formed, and said pressure sensor includes a main body housing with which said screw section is formed integrally, and wherein a gasket is provided between said main body housing and said protruding section, said gasket surrounding said screw section and defining an annular chamber between itself and said screw section, said at least one air inlet allowing fresh air to enter said mixing chamber through said annular chamber.

21. An intake pipe pressure detecting device as claimed in claim 20, wherein the wall of said intake pipe includes a protruding section in which a screw hole is formed, said pressure sensor having a screw section which is adapted to be engaged with said screw hole, said mixing chamber being formed inside said screw section.

22. An intake pipe pressure detecting device as claimed in claim 8, wherein the wall of said intake pipe includes a protruding section in which a screw hole is formed, said pressure sensor having a screw section which is adapted to be engaged with said screw hole, said mixing chamber being formed inside said screw section.

23. An intake pipe pressure detecting a device for detecting a pressure in a section of an intake pipe in an internal combustion engine which is on the downstream side of a throttle valve provided in the intake pipe, comprising:
    a pressure sensor,
    a pressure introducing path for introducing the pressure in the intake pipe into said pressure sensor, and a mixing chamber which is formed in a joint section between said pressure introducing path and the intake pipe and which has a diameter D and an opening area that is larger than that of said pressure introducing path, said pressure introducing path communicating with said mixing chamber, said mixing chamber opening into said intake pipe and including at least one air inlet situated at a distance l from the intake pipe and adapted to allow air in an amount Q to enter said mixing chamber, thereby generating an air flow which is directed from the mixing chamber to the intake pipe,
    wherein said at least one air inlet is provided at a plurality of positions in said mixing chamber.

* * * * *